United States Patent

[11] 3,633,887

[72] Inventors: Horst Bechthold, Frankfurt-Fechenheim; Heinz Dittmar; Ernst Heinz, both of Frankfurt; Rolf Rennhack, Schwalbach, all of Germany
[21] Appl. No.: 10,582
[22] Filed: Feb. 11, 1970
[45] Patented: Jan. 11, 1972
[73] Assignee: Metallgesellschaft Aktiengesellschaft
[32] Priority: Feb. 12, 1969
[33] Germany
[31] P 19 06 895.2

[54] METHOD OF AND APPARATUS FOR THE DIRECT HEATING OF FLUIDIZED-BED AND VORTEX-LAYER REACTORS
15 Claims, 5 Drawing Figs.

[52] U.S. Cl. .................................... 263/21 A, 431/170
[51] Int. Cl. .................................... F27b 15/10

[50] Field of Search .......................... 263/21 A; 34/57 A; 431/170

[56] References Cited
UNITED STATES PATENTS
1,847,020  2/1932  Parker et al. ............... 431/170
2,529,366  11/1950  Bauer ....................... 263/21 A Primary Examiner—John J. Camby
Attorney—Karl F. Ross ABSTRACT: A method of and an apparatus for the direct heating of fluidized-bed and vortex-layer reactors in which the nozzle grate is provided with a plurality of uniformly spaced coaxial tube members, one of the chambers of which is supplied with air while the other is supplied with a liquid (hydrocarbon) fuel. Within the members, there is provided an impingement-type atomizing surface at which the liquid is atomized and mixed with the air just as the mixture enters the reactor.

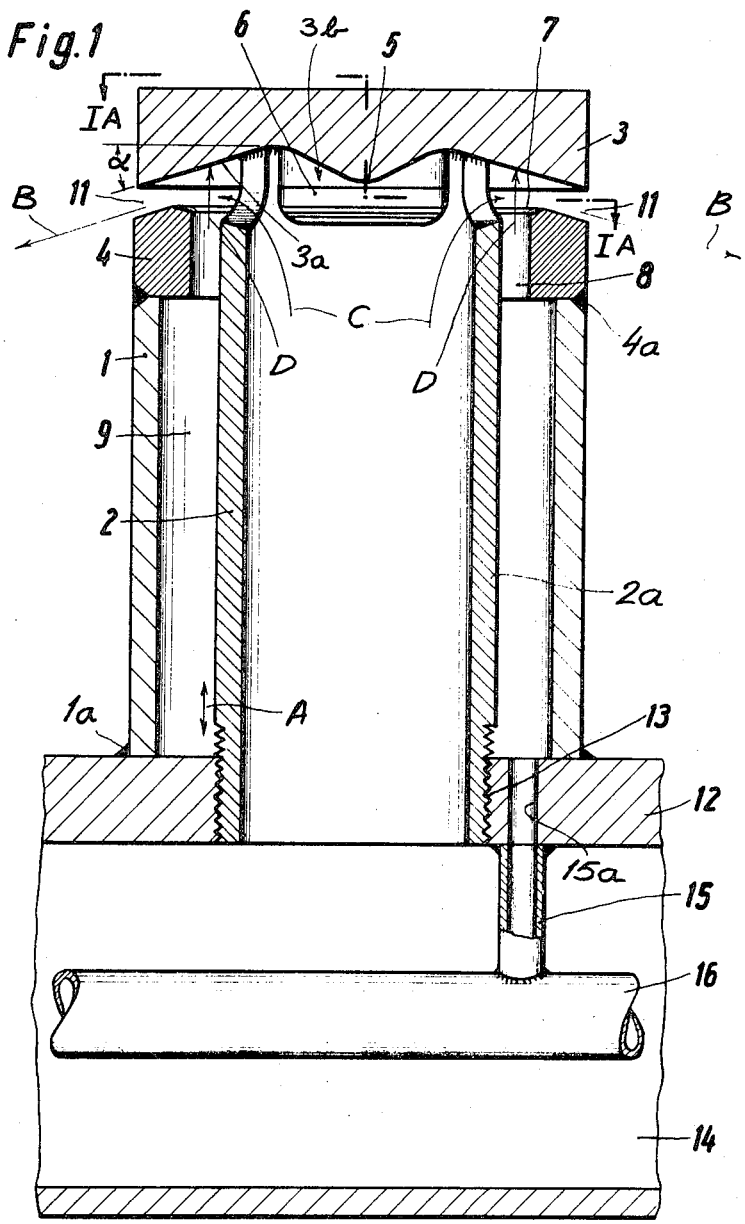

Horst Bechthold
Heinz Dittmar
Ernst Heinz
Rolf Rennhack
INVENTORS.

BY

Karl F. Ross
Attorney

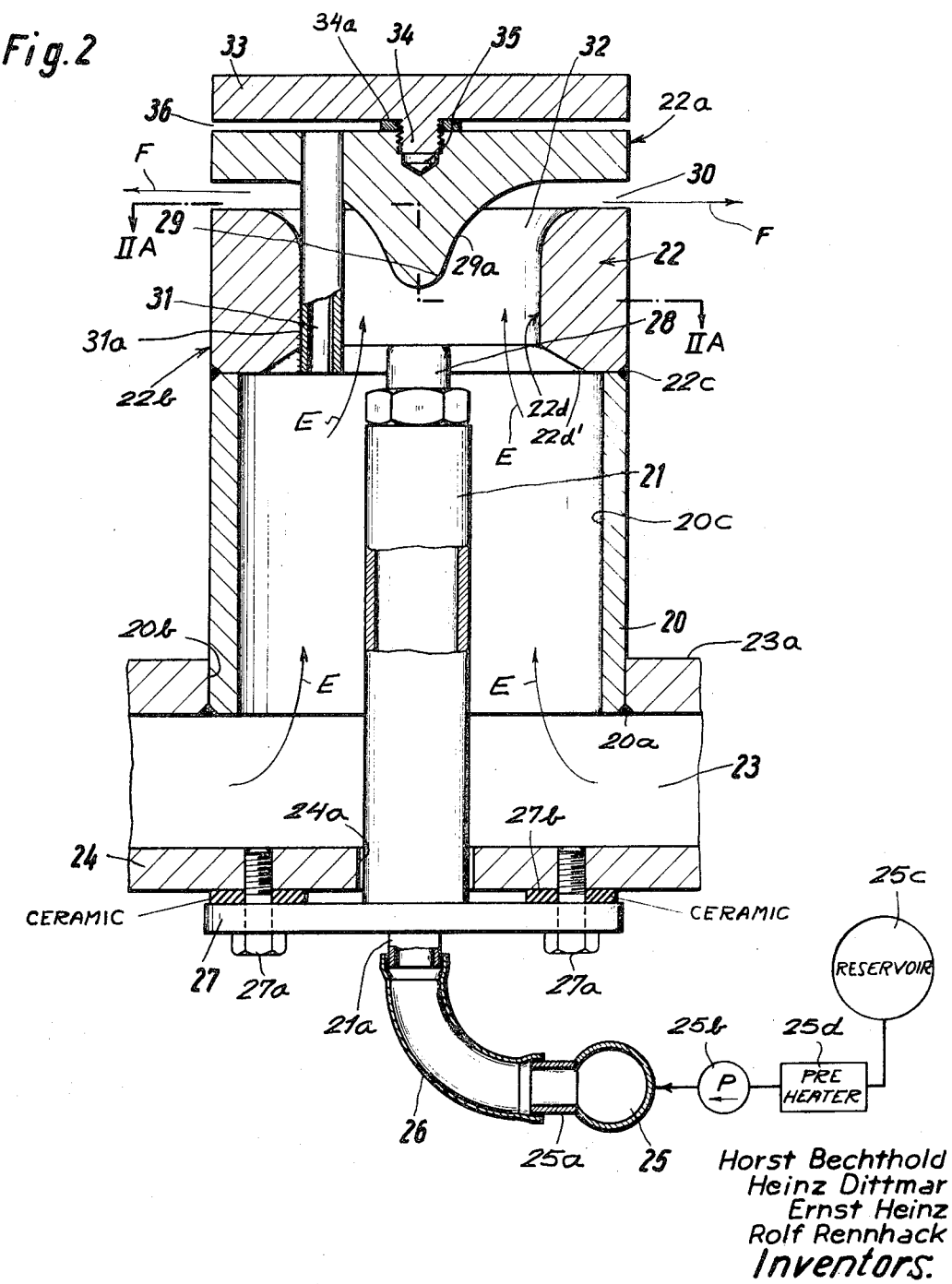

METHOD OF AND APPARATUS FOR THE DIRECT HEATING OF FLUIDIZED-BED AND VORTEX-LAYER REACTORS

FIELD OF THE INVENTION

Our present invention relates to a method of and an apparatus for the direct heating of fluidized-bed or vortex-layer reactors.

BACKGROUND OF THE INVENTION

Fluidized-bed and vortex-layer reactors of various types have been proposed heretofore for carrying out chemical and physical reactions and effecting a direct heat exchange between a relatively hot material and a relatively cool material.

In principle, a carrying gas is introduced from below into the reactor and entrains a particulate material in a vortex pattern generally inwardly from the sides of the reactor so that a thorough mixing and substantially homogeneous reaction is effected. The term "vortex-layer reactor" is used herein to describe substantially any reactor in which a carrying and/or heating gas is introduced at the base of the reactor from a nozzle, slot or other gas distributor, to sustain a substantially constant vortex.

The reactors include fluidized-bed driers as may be used for the regeneration of pickling baths and the reactors described at pages 20–43 ff. of *Perry's Chemical Engineers Handbook*, McGraw-Hill Book Company, New YOrk, 1963.

The gas distributors and burner arrangements of fluidized-bed reactors of the aforementioned type can comprise a slotted grate or a nozzle hearth through which the fluidized gas is introduced to the bed from below. When heating of the bed is required, it has been the common practice to use oxygen as the carrying gas and as a combustion-sustaining gas, the fuel being introduced above the hearth through burners or lances extending through walls of the fluidized-bed chamber.

This arrangement has been found to be disadvantageous in failing to distribute the heat and hot gases uniformly throughout the interior of the vortex layers of the fluidized bed. The fuel in this case is often finely divided solids and combustion is inefficient with at least part of the fuel burning off in the gas-collecting chamber above the bed. Fuel consumption is high, efficiency is low and homogeneity is poor. In other reactors, fuel nozzles are provided in the reactor grate or hearth, while oxygen nozzles are distributed along the grate or hearth, while oxygen nozzles are distributed along the grate to introduce the combustion-sustaining gas to the system. In these systems as well, there is insufficient mixing of fuel and air and, as a consequence, flame is observed above the bed, thereby indicating that fuel consumption is excessive and heating efficiency is low.

Aside from the disadvantages enumerated above, it may be noted that it has hitherto been practically impossible to obtain a uniform heating of a fluidized-bed reactor with liquid fuels and especially the high-density, low-cost fuel oils which are able to afford the greatest economy with respect to fuel utilization. Incomplete combustion, premature mixing and inefficient mixing of the fuel with air are difficulties which have plagued attempts to use such fuels.

OBJECTS OF THE INVENTION

It is, therefore, the principal object of the present invention to provide an improved method of directly heating a fluidized-bed or vortex-layer reactor or drier whereby the aforementioned disadvantages are avoided.

It is another object of the invention to provide a method of directly heating a fluidized-bed or vortex-layer reactor which permits liquid hydrocarbon fuels to be used efficiently and economically.

Still further, it is an object of this invention to provide a method of operating a fluidized-bed or vortex-layer reactor or drier which affords uniform heating and fuel economy and thereby renders the entire operation more economical than earlier systems.

It is another important object of the instant invention to provide an apparatus or nozzle structure for a fluidized-bed or vortex-layer reactor which enables the use of liquid hydrocarbon fuels and yet obviates the other disadvantages of earlier systems discussed above.

SUMMARY OF THE INVENTION

These objects and others which will become apparent hereinafter, are attained in accordance with the present invention, with a system which employs an oxygen-containing carrier gas which is distributed across the reactor cross section from below in partial streams, with each of these partial streams being used to atomize a liquid hydrocarbon fuel just prior to its entry into the fluidized-bed chamber such that the finely divided fuel particles are entrained by the partial streams of the combustion-sustaining gas into the vortex layer or fluidized bed.

According to an important feature of this invention, the hearth of the fluidized-bed chamber is provided with two-duct inlets for introducing the liquid fuel and air mixture into the chamber, the system being uniformly distributed along the base thereof. Each of the two-duct distributor heads, according to the present invention, comprises a pair of coaxial tubes defining an inner and an outer passage communicating with the interior of the fluidized-bed chamber through at least one lateral opening, an impingement-type liquid-atomizing surface being provided ahead of the passage through which the liquid fuel is transported to finely subdivide the liquid fuel just ahead of this opening. Advantageously, the impingement-type atomizing surface extends to or defines the opening. Moreover, we prefer to provide a distributing head in the two-duct assembly which communicates with one or more openings uniformly distributed about the circumference of the assembly and defining a mixing chamber into which both passages open.

In accordance with a further feature of this invention, the fuel-supply pipe communicates with a plurality of risers each of which opens into the inner or outer passage, while a distributing chamber is connected with a blower to deliver air to all of the air passages. Between the two-duct assemblies of the present invention, we prefer to provide additional single-duct structures for delivering additional fluidizing and combustion air to the system.

Experiments have shown that, when the liquid fuel and the combustion-sustaining and fluidizing gas are delivered to the fluidizing bed from separate passages in a two-duct structure and then emerge through separate sets of openings, the mixing necessary to sustain the rapid and uniform combustion desirable in such reactors cannot result. By contract, with the system of the present invention whereby only a single set of openings is provided in a two-duct assembly, substantially complete mixing takes place in the mixing and atomizing chamber adjacent the openings so that a combustible mixture emerges from the latter. The outlet openings for the fluidizing gas are so dimensioned, in accordance with the present invention, as to sustain the minimum pressure drop permissible for the stationary formation of the fluidized bed. Of course, the principles of the present invention require maximum velocity and, according to this invention, the air passages of the two-duct assembly are dimensioned to have low pressure drop so that a relatively high pressure drop may be sustained at the orifices between the mixing chamber and the fluidized bed. The increasing velocity corresponding to the increased pressure drop in the region of the outlets further ensures a thorough mixing of the liquid fuel and the air and a further subdivision of any droplets of the liquid fuel above the aerosol range. It has been found that the mixture emerging from the outlets is a substantially fully homogeneous combustible composition which burns directly adjacent the outlets with a consequent increase in the gas volume in the lowest portion of the fluidized bed. A uniform heating of the fluidized bed and mixture of the gases, solids, etc., of the fluidized bed with the heating gases is sustained. Surprisingly, these results are obtained even when the two-duct assemblies or heads are relatively widely spaced apart.

It has been recognized that the problems of heating fluidized-bed reactors include the overheating of fuels by thermal energy conducted away from the fluidized-bed chamber by the ducts supplying fuel to the gas distributor. This disadvantage is avoided in the system of the present invention since the tube through which the fuel is passed, is, in accordance with the present invention, coaxial with an air supply duct, the high velocity air stream serving as a cooling medium. Overheating of the fuel such that a chemical reaction between the fuel and oxygen occurs in the mixing chamber and cracking of the fuel results prior to entry of the fuel into the combustion chamber, is avoided. The system of the present invention may make use of highly viscous liquid fuels, e.g., heavy fuel oils, preheated to reduce the viscosity. Before the more readily flowable fuel is heated to a cracking or reformation temperature, it passes through the central passage of the two-duct assembly, preferably also through the air supply plenum or manifold, so that the fluidizing and combustion-sustaining air prevents, on the one hand, cooling of the preheated fuel and, on the other hand, an overheating thereby.

Still another feature of the present invention resides in the provision of the impingement surface ahead of the coaxial tubes such that it overhangs the outer tube and defines therewith a substantially annular opening of a width which is adjustable or may be fixed. The annular compartment between the two ducts may be defined in part by a inward bulge or protuberance of the impingement surface, so that mixing occurs between the inner and outer ducts and between the bulge and the outlet.

According to another feature of this invention, the outer duct is mounted upon the gas distributing floor of the fluidized bed chamber and the air supply passage communicates with an air plenum or chest beneath this floor. The liquid hydrocarbon fluid is fed through individual tubes to the fuel passages of the two-duct assemblies from a manifold disposed within or underlying the air plenum.

Preferably, when the annular space between both ducts is used as the fuel-supply passage, the outer duct can be welded to the gas-distributor plate in alignment with an opening formed therein and around a bore communicating with the supply pipe for the fuel. The inner duct is, in this case, threaded into the opening in the distributor plate, the opening communicating with the air chamber or chest. This system is particularly advantageous when the fuel is not thermally unstable and has low viscosity (e.g., light fuel oil).

When viscous fuel oils of low thermal stability are used, it is advantageous to provide the inner tube as the fuel-carrying duct while the outer tube is fixed upon the gas distributor plate and communicates with the plenum therebelow. The central or inner tube may here be formed with an atomizing nozzle directed against the inwardly bulging central portion of the impingement surface of the mixing and atomizing head. According to an important feature of this invention, the mixing and atomizing chamber is formed ahead of the gas supply duct which may be provided with a constriction to accelerate the gas flow at the point at which the atomized fuel is mixed therewith. With such fuels, preheating has been found to be advantageous.

The invention thus resides, in part, in a method of operating a fluidized-bed reactor wherein a fluidized bed is sustained by the introduction of an oxygen-containing carrier gas through a gas distributor at the base of the fluidized bed chamber, the carrier gas being supplied to the reactor in a plurality of partial streams at the gas distributor through one duct of a plurality of coaxial duct heating units. A liquid fuel is atomized and mixed with the partial streams of oxygen-containing gas immediately prior to the entry thereof into the fluidized bed chamber whereby the partial streams of the carrier gas sustain combustion of the atomized fuel substantially at the region at which the mixture enters the chamber. The carrier gas is accelerated prior to its entry into the fluidized-bed chamber and substantially in the regions in which the carrier gas is mixed with the atomized fuel. Further quantities of carrier gas are introduced into the reactor through the gas distributor at locations spaced from the streams which are mixed with the liquid fuel after atomization of the latter. The fuel, in turn, is atomized, at least in part, by projecting it against an impingement surface lying generally transversely to the direction of introduction of the streams, the resulting mixture being delivered to the fluidized-bed chamber laterally of this impingement surface.

DESCRIPTION OF THE DRAWING

The above and other objects, features and advantages of the present invention will become more readily apparent from the following description, reference being made to the accompanying drawing in which:

FIG. 1 is an axial cross-sectional view illustrating a first embodiment of the invention;

FIG. 2 is a view similar to FIG. 1, illustrating another embodiment of the invention;

SPECIFIC DESCRIPTIONS

Figure 2A:
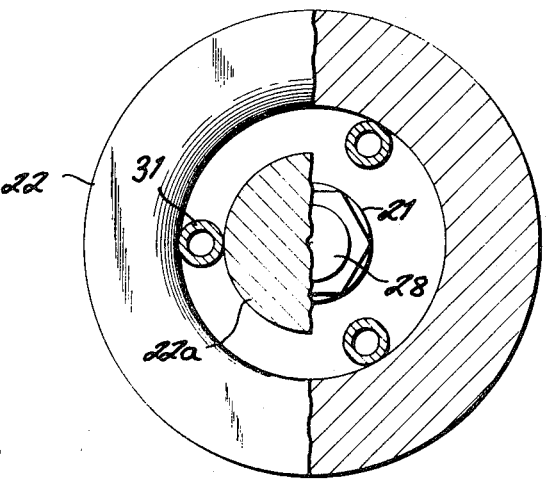
FIG. 2A is a section along the line IIA—IIA in FIG. 2.
Figure 3:
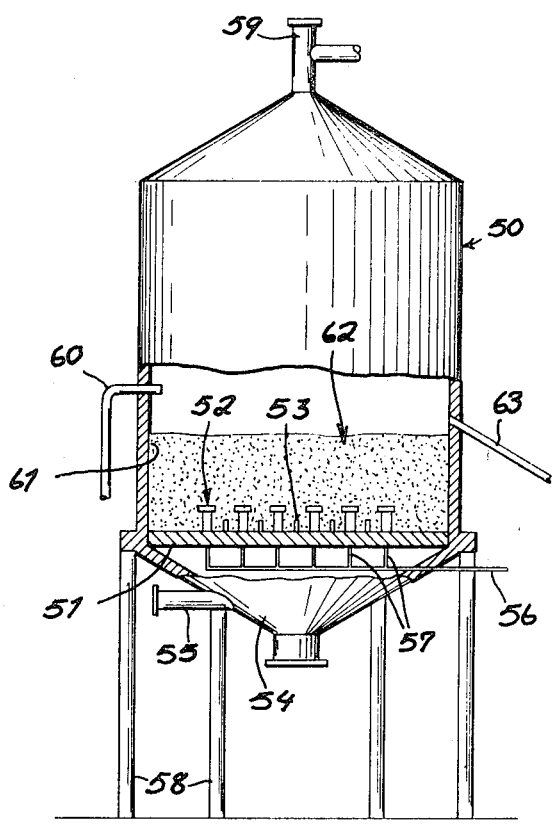
FIG. 3 is an elevational cross-sectional view illustrating a fluidized-bed reactor embodying the present invention.

Referring first to FIG. 3, it can be seen that the fluidized-bed reactor 50 may be constituted by a cylindrical vessel having a gas distributor plate 51 formed with upstanding coaxial inlets 52 substantially uniformly spaced therealong and constituting the direct-heating means of the present invention. The coaxial duct inlets for fuel and carrier gas may be those shown at FIG. 1 of FIG. 2 and described in greater detail below. Spaced from these heating assemblies, are inlets 53 which communicate solely with the air chest or plenum 54 to which the carrier gas is supplied at 55. The liquid hydrocarbon fuel is delivered to the heating units 52 via a pipe 56 having risers 57 communicating with the liquid ducts of the coaxial inlets.

The reactor 50 is mounted on a stand 58 and has a gas outlet 59, an inlet 60 for the material to be treated and a fluidized-bed chamber 61 in which the fluidized bed 62 is maintained in a vortexlike turbulent motion. An outlet 63 for the solids of the fluidized bed is also provided. The reactor of FIG. 3 is, of course, conventional except for the construction of the heating means and the gas distributor plate.

Figure 1A:
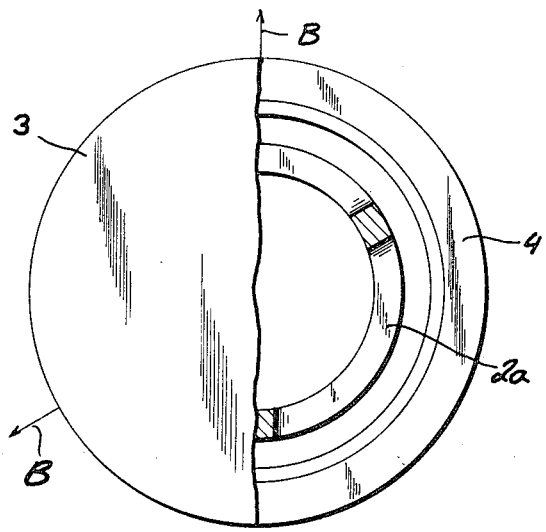
FIG. 1A is a view partly in cross section along the line IA—IA of FIG. 1 and drawn to a reduced scale.

In FIGS. 1 and 1A, there is shown an embodiment of the heating unit of this invention which comprises an outer tube 1 welded at 1a to the surface of the gas distributor plate 12 and coaxially surrounding an inner tube 2 to define the annular fuel passage 9. The tube 2, whose lower end is threaded at 13 into an opening of the gas distributor plate 12, is vertically adjustable (arrow A) by rotation to define the width of the lateral outlet opening 11.

The mixing and atomozing head, according to this invention, comprises a lower portion 4 in the form of a ring which is welded at ra to the upper end of the outer tube 1 and defines an annular clearance or mouth 8 for the passage 9 around the tube 2. Clearance 8, therefore, constitutes a slight construction with minimum pressure drop but the tendency to increase the velocity of the liquid fuel and project it against the outwardly and downwardly divergent impingement surface 3a formed on the underside of a plate or disk 3 of the distributing and atomizing head or chamber. The chamber is represented generally at 3b and is formed with the outlet 11, in this case directed downwardly and outwardly in a horizontal plane but may be directed downwardly through a maximum angle ($\alpha$) of 150°.

Centrally of the upper part 3 of the atomizing chamber, we provide an inwardly extending axial bulge protruding into the inner tube 2 whose interior 2a defines the air passage. The rising air stream is diverted outwardly by the bulge 5 through passages 6 formed in the upper end of the tube 2 (arrow C) where it encounters the fuel stream (arrow D) at an increased velocity resulting from the acceleration of the air through the somewhat constricted passages 6. The atomized fuel is entrained by the outwardly deflected airstream and emerges from opening 11 in a homogeneous mixture which has been found to ignite and burn substantially completely immediately around the outlet 11.

The liquid fuel is delivered to the outer channel of duct 9 by risers 15 communicating with bores 15a in the gas distributor 12 outwardly of the threaded junction 13 between the inner tube 2 and the gas distributor plate. The risers 15, in turn, are supplied by the fuel manifold pipe 16 as previously described. The manifold for distributing the liquid fuel is here shown to be enclosed in the air plenum or chest 14 which communicates with the passages 2a of the inner tube. This embodiment is, as previously noted, particularly adapted to operate with low-viscosity fuels of high thermal stability and maximum pressure drop, such fuels being more readily atomized through relatively large orifices.

In FIGS. 2 and 2A, we have shown an embodiment of the heating system which is particularly advantageous when used with high-viscosity hydrocarbon fuels (e.g., heavy fuel oil). In this embodiment, the air chamber or plenum 23 is located below the gas-distributor plate 23a and has a bottom wall 24 formed with openings 24a through which upwardly extending inner tubes 21 are passed. The inner tube 21 carries an annular transverse flange 27 which is bolted at 27a to the underside of the plate 24 while a disk-shaped heat-resistant gasket 27b is interposed between the flange 27 and wall 24. The pipe 21 has a fitting 21a projecting below the flange 27 and receiving a flexible conduit 26 connecting the manifold pipe 25 and its fitting 25a with the heating units. The manifold pipe 25 is supplied with the viscous fuel oil by a pump 25b from a reservoir 25c through a preheater 25d of conventional construction.

The outer tube 20 of the heating unit is welded at 20a within a bore 20b of the gas distributor plate 23a coaxial with the opening 24a and the pipe 21 to define an air passage 20c communicating with the plenum 23.

An atomizing and mixing chamber 32 is defined by an upper body 22a and a lower body 22b of a distributing head generally designated 22. The lower body is a relatively massive ring welded at 22c to the upper end of the pipe 20 and defining a central passage 22d for the oxygen-containing carrier gas (arrows E). The lower portion of this passage is beveled inwardly and upwardly and frustoconically converges upwardly at 22d' just ahead of the atomizing nozzle 28 to form a constriction which accelerates the carrier gas in the region at which the liquid fuel is atomized.

The nozzle 28 is trained axially at an inwardly extending bulge 29 of the upper body 22a of the distributor head, this body being constituted as a plate positioned ahead of the fuel-air ducts and defining an outwardly directed impingement surface 29a. In this case, the mixture of the carrier gas and atomized fuel passes horizontally (arrows F) outwardly through the lateral opening 30 surrounding the ducts. The upper body is held in place by a plurality of tubes 31 welded to the inner wall of the passages 22d at 31a and communicating between the duct 20 and a narrow gap 36 serving as a cooling passage to prevent buildup of excessive temperatures of the body 22a and thereby preclude thermal transformation of the thermally unstable liquid fuel. The gap 36 is defined between a disk 33 and the plate 22a, the disk 33 having an axial stud 34 threaded into a bore 35. A spacer ring 34a may be clamped between these members. In this system, the mixing chamber 32 is located inwardly of the tubes 31. The quantity of air bypassed through the cooling channel 36 can be controlled by proper selection of the thickness of the washer 34a. In this embodiment, the angle $\alpha$ included between the outflow and the horizontal is 0, although it should be noted that a maximum of 15° (toward the floor of the reactor) is permissible. Surprisingly, the system of the present invention as illustrated in FIGS. 1 and 2, with a common outlet for both the carrier gas and the atomized fuel is substantially unaffected by a reduction or an increase in the supply of fuel because of the relatively high velocity of the carrier gas. It is, therefore, possible to vary the fuel supply to one or more of the heating units without materially affecting the efficiency thereof and by relatively simple means.

EXAMPLE

A fluidized-bed reactor for regeneration of a hydrochloric acid pickling bath is provided with a gas distributor having three heating units of the type shown in FIG. 1. The fluidized bed had a diameter of 500 mm. and was composed of iron oxide particles. Preconcentrated slurry or solution from the pickling bath is introduced as a feed stock. The temperature in the fluidized bed was maintained at 850° C. by supplying 200 m.$^3$ per hour (stp) of air as the carrier gas while 6 kg. per hour of light fuel oil is introduced through the three heating units. All of the carrier gas was in this case passed through the heating units.

In a parallel test, the same reactor was provided with a slotted grate gas distributor and supplied with air from below, fuel oil being introduced from a single laterally disposed lance. With the same rate of treatment of the pickling bath, the comparison test required 21 kg. per hour of fuel and 280 m.$^2$ per hour (stp) of carrier gas to maintain the fluidized bed temperature of 850° C. Simultaneously the temperature above the fluidized bed in the comparison test increased by 100° C. thereover, indicating the existence of an afterburning above the bed. This indication was confirmed by the visible observation of flames above the bed. In the example using the system of FIG. 1, no afterburning was noted. When the air supply in the comparison test was reduced to 220 m.$^3$ per hour (stp) composition appeared to be defected and it was difficult to maintain the temperature of 850° C. even by the use of additional quantities of fuel oil.

When the system of FIG. 2 was used with heavy fuel oil, results similar to those obtained with the system of FIG. 1 were observed. When the heavy fuel oil was preheated to a temperature of 130° C. substantially no thermal decomposition of the fuel oil during or prior to atomization was noted.

We claim:

1. In a method of operating a fluidized-bed reactor wherein a fluidized bed is sustained by introduction of an oxygen-containing carrier gas through a gas distributor at the base of a fluidized-bed chamber, the improvement which comprises the steps of feeding said carrier gas into the reactor in a plurality of partial streams at said gas distributor; and atomizing a liquid fuel and mixing the atomized liquid fuel with said partial streams immediately prior to the entry thereof into the fluidized-bed chamber whereby said partial streams sustain combustion of the atomized fuel substantially at the regions at which the mixture enters the chamber.

2. The improvement defined in claim 1, further comprising the step of accelerating said carrier gas prior to its entry into said chamber and substantially in the regions in which said carrier gas is mixed with said atomized fuel.

3. The improvement defined in claim 1, further comprising the step of introducing further quantities of carrier gas into said reactor through said gas distributor at locations spaced from said streams and without admixture of said fuel therewith.

4. The improvement defined in claim 3 wherein said fuel is atomized at least in part by projecting it against an impingement surface lying generally transversely of the direction of introduction of said streams and said liquid fuel into said chamber, the mixture of said carrier gas and atomized fuel being delivered into said chamber laterally of said surface.

5. The improvement defined in claim 4 wherein said liquid fuel is a heavy fuel oil, further comprising the steps of preheating said fuel oil prior to its passage through said gas distributor and surrounding the fuel oil with a sheath of said carrier gas in the region in which said fuel oil traverses said gas distributor.

6. In a fluidized-bed reactor having a fluidized-bed chamber and a gas distributor at the base of said fluidized-bed chamber for introducing an oxygen-containing carrier gas into said fluidized-bed chamber, the improvement which comprises:

liquid-fueled means for directly heating a fluidized bed in said fluidized-bed chamber and including a pair of coaxial tubes upstanding from said gas distributor and defining an outer duct and an inner duct;

means for supplying said oxygen-containing carrier gas to one of said ducts;

means for supplying a liquid fuel to the other of said ducts; and means defining an atomizing and mixing compartment at the upper ends of said tubes and communicating with said ducts for atomizing said liquid fuel and mixing same with the stream of oxygen-containing carrier gas traversing said one of said ducts, said compartment discharging the mixture of said carrier gas and atomized fuel into said fluidized-bed chamber immediately upon atomization and mixing, said gas distributor including an upper gas distributor plate forming the base of said fluidized-bed chamber and defining with a lower plate an air plenum communicating with said outer duct, the outer one of said tubes being rigid with said upper plate, said means for supplying liquid fuel to the inner tube extending at least in part through said plenum, said means defining said atomizing and mixing compartment including an annular lower body fixed to said outer tube and an upper body spaced from said lower body to define a lateral opening therewith communicating between said compartment and said fluidized-bed chamber, said upper body forming an impingement surface directly ahead of said inner tube.

7. The improvement defined in claim 6 wherein said liquid fuel is supplied to said inner duct and said oxygen-containing carrier gas is air supplied to said outer duct.

8. The improvement defined in claim 6 wherein said inner tube is formed with an atomizing nozzle trained upon said impingement surface, said impingement surface being provided with a downwardly protruding bulge aligned with said nozzle.

9. The improvement defined in claim 8, further comprising means forming a cooling chamber in said upper body communicating with said outer duct, said means for supplying said liquid fuel to said inner tube including a supply pipe externally of said plenum, conduit means connecting said supply part with said inner tube externally of said plenum, said inner tube being formed with a flange fixed to the underside of said lower plate.

10. The improvement defined in claim 9 wherein said means supplying said liquid fuel includes preheating means connected with said pipe.

11. The improvement defined in claim 6 wherein said compartment is formed with a lateral opening discharging the mixture of atomized fuel with said carrier gas outwardly at an angle with the horizontal ranging from 0° to 15° toward the gas distributor.

12. The improvement defined in claim 6, further comprising means for accelerating said oxygen-containing carrier gas prior to its passage into said compartment.

13. In a fluidized-bed reactor having a fluidized-bed chamber and a gas distributor at the base of said fluidized-bed chamber for introducing an oxygen-containing carrier gas into said fluidized-bed chamber, the improvement which comprises:

liquid-fueled means for directly heating a fluidized bed in said fluidized-bed chamber and including a pair of coaxial tubes upstanding from said gas distributor and defining an outer duct and an inner duct;

means for supplying said oxygen-containing carrier gas to one of said ducts;

means for supplying a liquid fuel to the other of said ducts; and means defining an atomizing and mixing compartment at the upper ends of said tubes and communicating with said ducts for atomizing said liquid fuel and mixing same with the stream of oxygen-containing carrier gas traversing said one of said ducts, said compartment discharging the mixture of said carrier gas and atomized fuel into said fluidized-bed chamber immediately upon atomization and mixing, said gas distributor including a plate and means forming an air plenum beneath said plate, the outer of said tubes being fixed to said tubes threadedly engaging said plate and vertically adjustable thereon, said means for supplying liquid fuel to said other duct including an opening formed in said plate and communicating with said outer duct between said tubes, said means defining said compartment including an annular lower body fixed to said outer tube and an upper body spaced from said lower body and fixed to said inner tube while defining an impingement surface extending outwardly beyond said outer duct.

14. The improvement defined in claim 13 wherein said compartment is formed with a lateral opening discharging the mixture of atomized fuel with said carrier gas outwardly at an angle with the horizontal ranging from 0° to 15′ toward the gas distributor.

15. The improvement defined in claim 13 further comprising means for accelerating said oxygen-containing carrier gas prior to its passage into said compartment.

* * * * *